United States Patent [19]

Bauer et al.

[11] Patent Number: 4,559,203

[45] Date of Patent: Dec. 17, 1985

[54] LIQUID/LIQUID EXTRACTION OF GALLIUM VALUES FROM BASIC AQUEOUS SOLUTIONS THEREOF

[75] Inventors: Denisé Bauer, Le Raincy; Patrick Fourré, Paris; Jean-Louis Sabot, Maisons-Laffite, all of France

[73] Assignee: Rhone-Poulenc Specialites Chimiques, Courbevoie, France

[21] Appl. No.: 526,808

[22] Filed: Aug. 26, 1983

[30] Foreign Application Priority Data

Aug. 26, 1982 [FR] France .................................. 82 14630

[51] Int. Cl.⁴ .............................................. C01G 15/00
[52] U.S. Cl. .................................. 423/112; 75/101 BE
[58] Field of Search ..................... 423/112; 75/101 BE

[56] References Cited

U.S. PATENT DOCUMENTS 3,971,843 7/1976 Helgorsky et al. ................. 423/112
4,241,029 12/1980 Helgorsky et al. ................. 423/112

OTHER PUBLICATIONS

Blake et al., "Proceedings of International Conf. on Peaceful Uses of Atomic Energy", vol. 28, 1958, Geneva, pp. 289–298.

*Primary Examiner*—H. T. Carter
*Attorney, Agent, or Firm*—Burns, Doane, Swecker & Mathis

[57] ABSTRACT

Gallium values are extracted and recovered from basic aqueous solutions thereof, notably from sodium aluminate solutions of Bayer process origin, by liquid/liquid extraction thereof with a water immiscible organic phase comprising an organic solvent having dissolved therein an organic-soluble substituted hydroxyquinoline and at least one organic-soluble organophosphorus compound comprising at least one acid function.

20 Claims, No Drawings

LIQUID/LIQUID EXTRACTION OF GALLIUM VALUES FROM BASIC AQUEOUS SOLUTIONS THEREOF

CROSS-REFERENCE TO RELATED APPLICATION

Our copending application, Ser. No. 526,809, now U.S. Pat. No. 4,485,076, filed concurrently herewith, and assigned to the assignee hereof.

BACKGROUND OF THE INVENTION

1. Field of the Invention

The present invention relates to the liquid/liquid extraction and recovery of gallium values from basic aqueous solutions thereof, and, more especially, to such liquid/liquid extraction and recovery employing a substituted hydroxyquinoline and an organic phosphorus compound.

2. Description of the Prior Art:

It is known to this art, from European Patent No. 2970, assigned to the assignee hereof, that the gallium values present in aqueous alkaline solutions may be extracted under kinetically improved conditions by utilizing an organic phase comprising a substituted hydroxyquinoline and further comprising at least one carboxylic acid function. Cf. U.S. Pat. Nos. 3,971,843, 4,169,130, 4,241,029, 4,369,166 and 4,372,923; and copending application, Ser. No. 824,068, filed Aug. 12, 1977, all assigned to the assignee hereof.

Nonetheless, serious need remains in this art for extractants other than those comprising at least one carboxylic acid function which are also capable of improving the velocity of extraction of gallium values from basic aqueous solutions thereof without adversely affecting the excellent rates of extraction which characterize the generic process.

SUMMARY OF THE INVENTION

Accordingly, a major object of the present invention is the provision of an alternate, kinetically improved process for the liquid/liquid extraction of gallium values contained in basic aqueous solutions thereof by contacting such aqueous solutions with an organic phase principally comprising an organic solvent, at least one substituted hydroxyquinoline, and which is characterized in that the organic phase further comprises an organic phosphorus compound containing at least one acid function.

DETAILED DESCRIPTION OF THE INVENTION

More particularly according to the present invention, the basic aqueous solutions treated consistent herewith are notably those in which the concentration in $OH^-$ may be as high as 13 to 14 g/l. Thus, the process of the invention is especially suitable for the extraction of the gallium values contained in the caustic sodium aluminate solutions resulting from the Bayer process for the production of alumina. The composition of these caustic solutions typically comprises $Na_2O$ contents ranging from 100 to 400 g/l and $Al_2O_3$ contents ranging from 40 to 150 g/l, with the so-called "attack" caustics typically comprising $Na_2O$ contents of about 300 g/l and $Al_2O_3$ contents of about 150 g/l, while the so-called "decomposing" solutions comprise from about 150 to 200 g/l $Na_2O$ and from about 70 to 100 g/l $Al_2O_3$.

The organic solvents employed according to the invention are diluents conventionally used in liquid/liquid extraction. They may be used either alone or as mixtures thereof. Among same, the aliphatic hydrocarbons are representative, for example, heptane and the petroleum cuts of kerosene type; as are the aromatic hydrocarbons, such as, for example, benzene, toluene, xylene and cuts of the SOLVESSO type (registered trademark of EXXON Corp.) and, finally, halogenated derivatives of such compounds, such as, for example, chloroform, carbon tetrachloride, dichloroethane and trichloropropane.

The substituted hydroxyquinolines envisaged hereby are those capable of extracting gallium by complexing therewith under the conditions of liquid/liquid extraction according to the invention. Furthermore, they must be more soluble under these conditions in the organic phase than in the aqueous phase.

The substituted hydroxyquinolines suitable for the purposes of the invention are preferably those having the general formula:

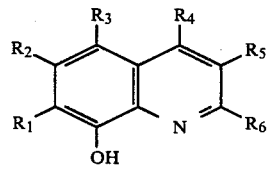

wherein $R_1$, $R_2$, $R_3$, $R_4$, $R_5$ and $R_6$ may be identical or different, and each represents hydrogen, halogen, an alkyl, alkenyl, alicyclic, or aryl radical, with the proviso that $R_1$, $R_2$, $R_3$, $R_4$, $R_5$ and $R_6$ cannot simultaneously be hydrogen.

Among such substituted hydroxyquinolines, especially preferred for the purposes of the invention are the α-alkenylhydroxy-8-quinolines, the β-alkenylhydroxy-8-quinolines and the alkylhydroxy-8-quinolines.

The preferred α-alkenylhydroxy-8-quinolines according to the invention have the general formula:

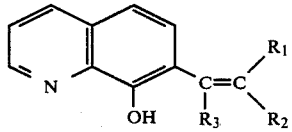

wherein $R_1$, $R_2$ and $R_3$ each represent a hydrogen atom or a hydrocarbon radical containing from 1 to 12 carbon atoms. Among these, most preferred are those having the general formula:

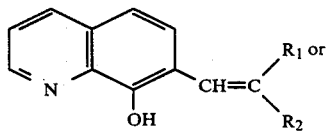

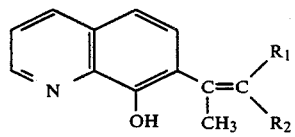

The preferred β-alkenylhydroxy-8-quinolines according to the invention have the following general formula:

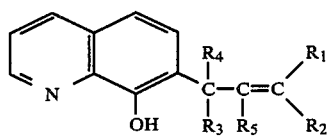

wherein $R_1$, $R_2$, $R_3$, $R_4$ and $R_5$ each represents a hydrogen atom or a hydrocarbon radical containing from 1 to 12 carbon atoms.

The preferred alkylhydroxy-8-quinolines according to the invention have the general formula:

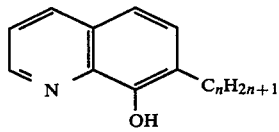

wherein n ranges from 1 to 20 and preferably ranges from 5 to 15.

These aforesaid hydroxyquinolines may be employed according to the invention either alone or in mixtures thereof.

The amount of the substituted hydroxyquinoline in the organic phase is not critical and may vary over wide limits. However, an amount ranging from 1 to 50% by volume with respect to the organic phase is typically suitable and an amount ranging from 6 to 12% is economically attractive.

The organic phosphorus compounds used according to the invention are preferably those having the following general formulae:

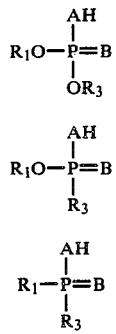

wherein $R_3$ represents $R_2$ or hydrogen, and $R_1$ and $R_2$ are alkyl, alkenyl, alicyclic, aryl or alkylaryl radicals containing from 1 to 20 carbon atoms and preferably from 5 to 15 carbon atoms.

A and B, which may be identical or different, each represents an oxygen or sulfur atom.

Thus, from among the aforesaid organic phosphorus compounds, the monoesters or diesters, or mixtures of monoesters and diesters, of phosphoric, phosphonic or phosphinic acids, or of thiophosphoric, thiophosphonic and thiophosphinic acids are suitable for use according to the invention.

Exemplary of such compounds, the following are representative: 2-diethylhexylphosphoric acid (HDEHP), tridecylphosphoric acid, 2-ethylhexyl-2-ethylhexylphosphonic acid (HEMEHP) (marketed under the trademark of PC 88A), dioctylphosphinic acid (HDOP) (marketed under the trademark of CYANEX 272), 2-diethylhexyldithiophosphoric acid (HDEHDTP), dioctyldithiophosphinic acid (HDODTP).

These compounds may be used either alone or in mixtures thereof. They must be more soluble under the extraction conditions of the invention in the organic phase than in the aqueous phase.

The amount of the organic phosphorus compound in the organic phase is not critical and may vary over wide limits. However, an amount less than 20% by volume with respect to the organic phase is typically suitable; an amount greater than 0 and up to 10% is economically attractive.

As is known in the art of liquid/liquid extraction, it may be advantageous to add to the organic phase various modifying agents. Among these, the following are representative: alcoholic compounds, in particular heavy alcohols having from 4 to 15 carbon atoms, and heavy phenols, together with various other solvating compounds, such as certain phosphoric esters, for example, tributyl phosphate, phosphine oxides and sulfoxides.

The temperature during the extraction according to the invention is not a critical factor. Indeed, it is one of the advantages provided by the process of the invention with respect to the prior art that the extraction may be carried out at any temperature. Thus, generally, an extraction temperature ranging from 10° C. to 50° C. will provide satisfactory extraction rates of gallium.

The nature of the atmosphere in which the process of the invention is conducted too is not critical. However, if it is desired to prevent or minimize a certain degradation of the extractant by oxidation over time, it is advantageous according to the process of the invention to carry out the extraction in an inert atmosphere. The inert atmosphere may consist in particular of an argon or nitrogen atmosphere.

In order to recover the gallium values from basic aqueous solutions by means of the process according to the invention, the extraction stage as such is followed by a stage of regenerating the organic phase by means of strong acids. Thus, the present invention also relates to a process for the liquid/liquid extraction of gallium values contained in basic aqueous solutions thereof by contacting the basic aqueous solution with an organic phase principally comprising an organic solvent, at least one substituted hydroxyquinolines and at least one organic phosphorus compound, and further wherein, subsequent to the extraction of the basic aqueous solution, the gallium containing organic phase which results is treated at least once with an aqueous solution of a strong acid, and the residual organic phase is separated from the aqueous acid solution and subsequently the gallium values are separated from the aqueous acid solution. The strong acids which may be used are preferably selected from among hydrochloric acid, sulfuric acid, nitric acid, hydrobromic acid and perchloric acid.

In the particular case where the basic aqueous solution is a caustic sodium aluminate solution resulting from the Bayer process for the production of alumina, it has been found that a certain amount of aluminum and sodium is transferred, in addition to gallium, from the caustic solution to the organic phase in the course of the extraction stage according to the invention. In this case, the subsequent regeneration step according to the invention then makes it possible, in particular according to different embodiments, to recover a more or less purified gallium.

According to a first embodiment, after the organic phase has been separated from the aqueous phase, the organic phase is contacted with an aqueous solution of a strong acid, the aqueous solution is separated from the organic phase and the gallium is recovered from the aqueous solution. The concentration of the acid solution used depends in particular on the amount of substituted hydroxyquinoline employed in the organic phase. In the case of the above-mentioned preferred amounts of hydroxyquinoline, the acid concentration in solutions of sulfuric, nitric or perchloric acids should preferably be higher than 1.2 M; if hydrochloric or hydrobromic acid is used, the acid concentration should preferably range from about 1.2 M to about 2.2 M.

According to a second embodiment, after separating the organic phase from the basic aqueous phase, the organic phase is contacted with a first dilute aqueous solution of an acid in order to transfer the sodium and the aluminum from the organic phase into the acid solution, while the gallium is retained in the organic phase, and, after having separated the organic phase from the dilute aqueous acid solution, the residual organic phase is contacted with a second, more strongly concentrated aqueous solution of an acid in order to transfer the gallium from the organic phase into the second aqueous acid solution, from which it is ultimately recovered. The concentration of the acid solutions used depends, in particular, on the amount of substituted hydroxyquinoline employed in the organic phase. In the case of the above-mentioned preferred amounts of hydroxyquinoline, the acid concentration of the first aqueous acid solution preferably ranges from about 0.2 M to about 0.7 M; and the concentration of the second aqueous acid solution is preferably higher than 1.2 M, when a solution of sulfuric acid or nitric acid or perchloric acid is used, and preferably ranges from about 1.2 to about 2.2 M when a solution of hydrochloric or hydrobromic acid is employed.

According to a third embodiment, after the organic phase has been separated from the basic aqueous phase, the organic phase is contacted with a first concentrated aqueous solution of an acid which is capable of forming an anionic gallium complex which is retained dissolved in the organic phase while the sodium and the aluminum pass into the aqueous acid solution; subsequently, the organic phase is separated from the aqueous acid solution and then is contacted with a second more dilute solution of the acid in order to transfer the gallium from the organic phase into the aqueous solution, from which the gallium is ultimately separated. The acids used in this third embodiment are preferably hydrochloric acid or hydrobromic acid. The acid concentrations of the acid solutions depend in particular on the amount of substituted hydroxyquinoline employed in the organic phase. In the case of the above-mentioned preferred amounts of hydroxyquinoline, the concentration of the first solution preferably ranges from about 4 M to about 8 M, and that of the second solution ranges from about 1.2 M and about 2.2 M.

The process according to the present invention may be carried out in conventional industrial apparatus used for liquid/liquid extraction. By means of the present invention, it is, in particular, possible to reduce the size of the mixing reactors to a very considerable extent as compared with reactors used in a conventional procedure, thus providing an important increase in productivity. It is thus possible, particularly by using a multistage countercurrent extraction system which requires less space, to achieve a nearly complete extraction of gallium values from basic aqueous solutions thereof.

In order to further illustrate the present invention and the advantages thereof, the following specific examples are given, it being understood that same are intended only as illustrative and in nowise limitative.

EXAMPLE 1

A Bayer process caustic solution having the composition of 80 g/l of Al$_2$O$_3$, 205 g/l of Na$_2$O, and 225 mg/l of Ga, was agitated at 25° C. with an equal volume of an organic phase having the following composition by volume:

| (i) Hydroxyquinoline A | 8% |
|---|---|
| (ii) n-Decanol | 10% |
| (iii) HDEHP (2-Diethylhexylphosphoric acid) | x% |
| (iv) Kerosene | (82−x)% |

After the admixture had separated into two phases, the amount of gallium obtained is reported in the Table I which follows, as a function of mixing time and the amount x of HDEHP employed.

TABLE I

| Composition of the organic phase | Amount of Gallium Extracted, in % | | | | |
|---|---|---|---|---|---|
| | Mixing time (minutes) | | | | |
| | 2 | 5 | 10 | 20 | 30 |
| x = 0 | 1 | 2 | 4 | 8 | 23 |
| x = 3 | 5 | 10 | 22 | 42 | 60 |
| x = 6 | 10 | 20 | 35 | 60 | 80 |
| x = 10 | 19 | 36 | 59 | 82 | 89 |

The results compiled in Table I evidence a substantial increase in the speed of extraction of gallium provided by the process according to the invention, using an organic phosphorus compound vis-a-vis a conventional process wherein x=0.

The aforesaid hydroxyquinoline A was a β-alkenyl-hydroxy-8-quinoline having the formula:

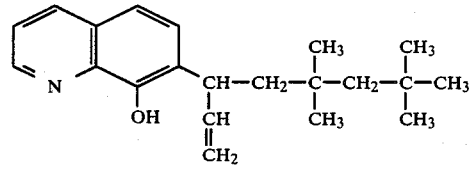

which is the active ingredient of the product marketed by Schering Co. under the trademark KELEX 100.

EXAMPLE 2

A Bayer process caustic solution having the composition given in Example 1 was agitated at 30° C. with an equal volume of an organic phase having the following composition by volume:

| (i) Hydroxyquinoline A | 8% |
|---|---|
| (ii) n-Decanol | 10% |
| (iii) 2-Ethylhexyl-2-ethylhexyl-phosphonic (HEHEHP) | 6% |

-continued

| | |
|---|---|
| (iv) Kerosene | 76% |

After the admixture had separated into two phases, the amount of gallium extracted is reported in the Table II which follows, as a function of mixing time.

TABLE II

| | Amount of Gallium Extracted, in % | | | | |
|---|---|---|---|---|---|
| | Mixing time (minutes) | | | | |
| Additive | 2 | 5 | 10 | 20 | 30 |
| HEHEHP 6% | 15 | 30 | 55 | 85 | 90 |

EXAMPLE 3

A Bayer process caustic solution having the composition given in Example 1 was agitated at 26° C. with an equal volume of an organic phase having the following composition:

| | | |
|---|---|---|
| (i) Hydroxyquinoline A | 8% | |
| (ii) n-Decanol | 10% | |
| (iii) Dioctylphosphinic acid (HDOP) | 3% | |
| (iv) Kerosene | 79% | |

After the admixture had separated into two phases, the amount of gallium extracted is reported in the Table III which follows, as a function of mixing time.

TABLE III

| | Amount of Gallium Extracted, in % | | | | |
|---|---|---|---|---|---|
| | Mixing time (minutes) | | | | |
| Additive | 2 | 5 | 10 | 20 | 30 |
| HDOP 3% | 6 | 10 | 18 | 35 | 55 |

EXAMPLE 4

This example also illustrates, with respect to the traditional process, the increase in speed of the extraction of gallium values according to the process of the invention when another hydroxyquinoline is used, together with a mixture of mono- and diesters of phosphoric acid.

A Bayer process caustic solution having the composition given in Example 1 was agitated at 30° C. with an equal volume of an organic phase having the following composition by volume:

| | | |
|---|---|---|
| (i) Hydroxyquinoline B | 10% | |
| (ii) n-Decanol | 10% | |
| (iii) Tridecylphosphoric acid (equimolecular mixture of H$_2$TDP and HDTDP) | 6% | |
| (iv) Kerosene | 74% | |

After the admixture had separated into two phases, the amount of gallium extracted is reported in the Table IV which follows, as a function of mixing time.

TABLE IV

| | Amount of Gallium Extracted, in % | | | | |
|---|---|---|---|---|---|
| | Mixing time (minutes) | | | | |
| Additive | 2 | 5 | 10 | 20 | 30 |
| H$_2$TDP + HDTDP 6% | 10 | 25 | 45 | 72 | 87 |

The aforesaid hydroxyquinoline B was an alkylhydroxyquinoline having the formula:

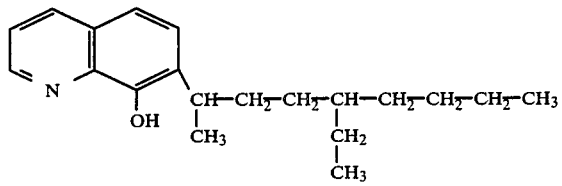

EXAMPLE 5

A Bayer process caustic solution having the composition given in Example 1 was agitated at 26° C. with an equal volume of an organic phase having the following composition:

| | | |
|---|---|---|
| (i) Hydroxyquinoline | 8% | |
| (ii) n-Decanol | 10% | |
| (iii) 2-Diethylhexyldithiophosphoric acid (HDEHDTP) | 6% | |
| (iv) Kerosene | 76% | |

After the admixture had separated into two phases, the amount of gallium extracted is reported in the Table V which follows, as a function of mixing time.

TABLE V

| | Amount of Gallium Extracted, in % | | | | |
|---|---|---|---|---|---|
| | Mixing time (minutes) | | | | |
| Additive | 2 | 5 | 10 | 20 | 30 |
| HDEHDTP 6% | 20 | 35 | 60 | 85 | 89 | the aforesaid hydroxyquinoline C was an α-alkenyl-hydroxyquinoline having the formula:

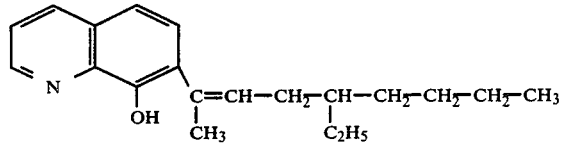

EXAMPLE 6

A Bayer process caustic solution having the composition given in Example 1 was agitated at 26° C. with an equal volume of an organic phase of the following composition:

| | | |
|---|---|---|
| (i) Hydroxyquinoline A | 8% | |
| (ii) n—Decanol | 10% | |
| (iii) Dioctyldithiophosphinic acid (HDODTP) | 3% | |
| (iv) Kerosene | 79% | |

After the admixture had separated into two phases, the amount of gallium extracted is reported in the Table VI which follows, as a function of mixing time.

TABLE VI

| | Amount of Gallium Extracted, in % | | | | |
|---|---|---|---|---|---|
| | Mixing time (minutes) | | | | |
| Additve | 2 | 5 | 10 | 20 | 30 |
| HDODTP 3% | 10 | 22 | 33 | 56 | 75 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for recovering gallium values contained in a basic aqueous solution thereof by liquid/liquid extraction, comprising contacting such basic aqueous solution with a water immiscible organic phase which comprises an organic solvent having dissolved therein an organic-soluble substituted hydroxyquinoline and at least one organic-soluble organophosphorus compound comprising at least one acid function, whereby said gallium values are extracted into the organic phase, separating the organic phase from the basic aqueous solution, and recovering the gallium values from the organic phase.

2. The process as defined by claim 1, said at least one organophosphorus compound comprising at least one acid function having one of the following general formulae:

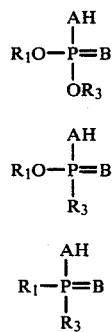

wherein $R_3$ is $R_2$ or hydrogen, $R_1$ and $R_2$ are alkyl, alkenyl, alicyclic, aryl or alkylaryl radicals containing from 1 to 20 carbon atoms, and A and B, which may be identical or different, are oxygen or sulfur.

3. The process as defined by claim 2, said at least one organophosphorus compound comprising at least one acid function having one of the following general formulae:

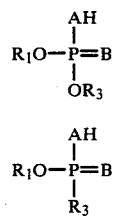

wherein $R_3$ is $R_2$ or hydrogen, $R_1$ and $R_2$ are alkyl, alkenyl, alicyclic, aryl or alkylaryl radicals containing from 5 to 15 carbon atoms, and A and B, which may be identical or different, are oxygen or sulfur.

4. The process as defined by claim 2, said at least one organophosphorus compound comprising a monoester or diester, or a mixture of monoester or diester, of phosphoric, phosphonic, phosphinic, thiophosphoric, thiophosphonic and thiophosphinic acids.

5. The process as defined by claim 4, said at least one organophosphorus compound comprising 2-diethylhexylphosphoric, tridecylphosphonic, 2-ethylhexyl-2-ethylhexylphosphonic, dioctylphosphinic, 2-diethylhexyldithiophosphoric or dioctyldithiophosphinic acid.

6. The process as defined in claim 2, said at least one organophosphorus compound comprising less than 20% by volume of said organic phase.

7. The process as defined in claim 6, said at least one organophosphorus compound comprising less than 10% by volume of said organic phase.

8. The process as defined in claim 1, said hydroxyquinoline having the following general formula:

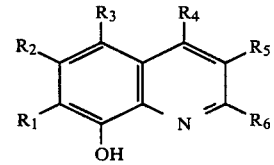

wherein $R_1$, $R_2$, $R_3$, $R_4$, $R_5$ and $R_6$, which may be identical or different, are each hydrogen, halogen, or an alkyl, alkenyl, alicyclic or aryl radical, with the proviso that $R_1$, $R_2$, $R_3$, $R_4$, $R_5$ and $R_6$ cannot simultaneously all be hydrogen.

9. The process as defined in claim 8, said hydroxyquinoline comprising an α-alkenylhydroxy-8-quinoline having the general formula:

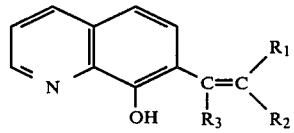

wherein $R_1$, $R_2$ and $R_3$ are hydrogen or a hydrocarbon containing from 1 to 12 carbon atoms.

10. The process as defined by claim 8, said hydroxyquinoline comprising a β-alkenylhydroxy-8-quinoline having the general formula:

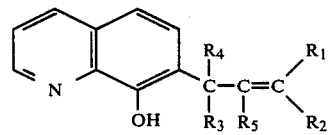

wherein $R_1$, $R_2$, $R_3$, $R_4$ and $R_5$ are hydrogen or a hydrocarbon containing from 1 to 12 carbon atoms.

11. The process as defined by claim 8, said hydroxyquinoline comprising an alkylhydroxy-8-quinoline having the general formula:

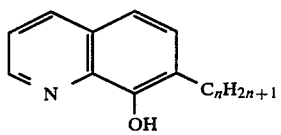

wherein n ranges from 1 to 20.

12. The process as defined by claim 8, said hydroxyquinoline comprising from 1 to 50% by volume of said organic phase.

13. The process as defined by claim 12, said hydroxyquinoline comprising from 6 to 12% by volume of said organic phase.

14. The process as defined by claim 1, said organic solvent comprising heptane, a petroleum cut of kerosene type, benzene, toluene, xylene, aromatic cuts, chloroform, carbon tetrachloride, dichloroethane, trichloropropane, and mixtures thereof.

15. The process as defined by claim 1, said organic phase further comprising an alcohol, a phosphoric ester, a phosphine oxide, a sulfoxide, or mixtures thereof.

16. The process as defined by claim 15, said organic phase further comprising a heavy alcohol or tributylphosphate.

17. The process as defined by claim 1, carried out in an inert atmosphere.

18. The process as defined by claim 1, comprising (i) contacting the basic aqueous solution with the organic phase, whereby gallium values are extracted from said basic aqueous solution and transferred into said organic phase, (ii) separating the organic phase from the basic aqueous phase, (iii) contacting said separated organic phase at least once with an aqueous solution of a strong acid, whereby gallium values are extracted from said organic phase and transferred into the aqueous acid solution, (iv) separating the organic phase from said aqueous acid solution, and (v) separating the gallium values from said aqueous acid solution.

19. The process as defined by claim 18, said strong acid comprising hydrochloric, sulfuric, nitric, hydrobromic or perchloric acid.

20. A process for recovering gallium values contained in a basic aqueous solution thereof by liquid/liquid extraction, comprising contacting such basic aqueous solution with a water immiscible organic phase which comprises an organic solvent having dissolved therein an organic-soluble substituted hydroxyquinoline and at least one organic-soluble organophosphorus compound capable of improving the velocity of extraction of gallium values from said basic aqueous solution, said organic phosphorous compound comprising at least one acid function having one of the following general formulae:

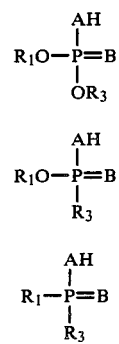

wherein $R_3$ is $R_2$ or hydrogen, $R_1$ and $R_2$ are alkyl, alkenyl, alicyclic, aryl or alkylaryl radicals containing from 1 to 20 carbon atoms, and A and B, which may be identical or different, are oxygen or sulfur.

* * * * *